United States Patent
Kertsman (10) Patent No.: US 10,239,123 B2
(45) Date of Patent: Mar. 26, 2019

(54) CUTTING INSERT HAVING TWO PERIPHERAL ABUTMENT RIDGES AND CUTTING TOOL

(71) Applicant: Iscar, Ltd., Tefen (IL)

(72) Inventor: Oleg Kertsman, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 85 days.

(21) Appl. No.: 15/472,653

(22) Filed: Mar. 29, 2017

(65) Prior Publication Data

US 2018/0281075 A1 Oct. 4, 2018

(51) Int. Cl.
| | | |
|---|---|---|
| *B32B 27/04* | (2006.01) | |
| *B32B 27/16* | (2006.01) | |
| *B23B 27/04* | (2006.01) | |
| *B23B 27/16* | (2006.01) | |

(52) U.S. Cl.
CPC .......... *B23B 27/04* (2013.01); *B23B 27/1622* (2013.01); *B23B 27/16* (2013.01); *B23B 2200/0423* (2013.01); *B23B 2200/123* (2013.01); *B23B 2205/12* (2013.01)

(58) Field of Classification Search
CPC ....... B23B 27/04; B23B 27/045; B23B 27/14; B23B 27/16; B23B 2200/0423; B23B 2200/121; B23B 2200/161; B23B 2205/12; B23B 29/043; Y10T 407/25
See application file for complete search history.

(56) References Cited

U.S. PATENT DOCUMENTS

| | | | |
|---|---|---|---|
| 4,890,961 A | 1/1990 | Carl et al. | |
| 5,032,050 A | * 7/1991 | Niebauer | B23B 27/045 407/114 |
| 5,921,724 A | 7/1999 | Erickson et al. | |
| 6,000,885 A | 12/1999 | Erickson | |
| 6,186,704 B1 | 2/2001 | Hale | |
| 7,094,006 B2 | 8/2006 | Hecht | |

(Continued)

FOREIGN PATENT DOCUMENTS

| | | | | |
|---|---|---|---|---|
| CH | 686935 A5 | * 8/1996 | ............ | B23B 27/16 |
| DE | 3816931 A1 | * 12/1988 | ............ | B23B 27/04 |

(Continued)

OTHER PUBLICATIONS

International Search Report dated Jun. 6, 2018, issued in PCT counterpart application (No. PCT/IL2018/050270).

(Continued)

*Primary Examiner* — Ryan C Rufo
(74) *Attorney, Agent, or Firm* — Womble Bond Dickinson (US) LLP (57) ABSTRACT

A cutting insert includes an insert longitudinal axis defining a forward to rear direction, opposing insert inner and outer side surfaces and an insert peripheral surface extending therebetween. The insert peripheral surface includes an insert rear end surface and an adjacent insert lower surface. The cutting insert includes two spaced apart peripheral abutment ridges that are distal the insert outer side surface and extend along the insert rear end surface and the insert lower surface, respectively. The two peripheral abutment ridges converge towards each other at an acute insert wedge angle in a rearward direction of the cutting insert, away from a cutting edge.

34 Claims, 5 Drawing Sheets

(56) References Cited

U.S. PATENT DOCUMENTS

| | | | |
|---|---|---|---|
| 7,726,218 B2 | 6/2010 | Furuki | |
| 8,747,032 B2 | 6/2014 | Oettle et al. | |
| 2003/0165362 A1* | 9/2003 | Hecht | B23B 27/08 407/107 |
| 2004/0022592 A1* | 2/2004 | Inayama | B23B 27/08 407/117 |
| 2009/0035075 A1* | 2/2009 | Hecht | B23B 27/007 407/104 |
| 2009/0285644 A1* | 11/2009 | Hecht | B23B 27/04 407/5 |
| 2013/0236256 A1 | 9/2013 | Kaufmann et al. | |
| 2017/0232524 A1* | 8/2017 | Makhlin | B23B 27/1622 407/114 |

FOREIGN PATENT DOCUMENTS

| | | | | |
|---|---|---|---|---|
| DE | 102004033929 B2 * | 1/2006 | | B23B 27/1659 |
| EP | 1205273 A1 * | 5/2002 | | B23B 27/04 |
| EP | 1375038 A1 * | 1/2004 | | B23B 27/045 |
| JP | 11-156605 A * | 6/1999 | | B23B 27/04 |
| JP | 2002-103106 A * | 4/2002 | | B23B 27/14 |

OTHER PUBLICATIONS

Written Opinion dated Jun. 6, 2018, issued in PCT counterpart application (No. PCT/IL2018/050270).

* cited by examiner

CUTTING INSERT HAVING TWO PERIPHERAL ABUTMENT RIDGES AND CUTTING TOOL

FIELD OF THE INVENTION

The subject matter of the present application relates to cutting tools, and in particular, to grooving and parting cutting tools, and further in particular, to face grooving cutting tools of the type in which a cutting insert is removably attached to an insert holder by a fastening member.

BACKGROUND OF THE INVENTION

A cutting tool for grooving metalworking operations may comprise a cutting insert removably attached to an insert holder. More precisely, the insert holder has a lateral insert pocket and the cutting insert is releasably retained in the insert pocket.

During said metalworking operations a cutting force is applied on the cutting insert at the cutting edge. The direction of the cutting force is substantially downwards and somewhat inwards towards the central body. The said cutting force generates a torque about a pivot point, the pivot point typically being a forwardmost abutment point between a lower surface of the cutting insert and a lower supporting surface of the insert holder. The torque forces the cutting insert to rotate in a rotational direction about the pivot point. To prevent the rotational displacement of the cutting insert, the insert pocket has at least one peripheral wall abutment surface, extending from a pocket base surface, that faces against the rotational direction.

In some such cutting tools, the peripheral contact between the peripheral surfaces of the cutting insert and the peripheral wall abutment surfaces of the insert pocket is planar to planar. Examples of such cutting tools are disclosed in, for example, U.S. Pat. Nos. 4,890,961, 6,000,885, 7,094,006 B2, 7,726,218 B2 and 8,747,032 B2.

It is an object of the subject matter of the present application to provide a new and improved cutting insert.

It is another object of the subject matter of the present application to provide a new and improved cutting tool.

It is a further object of the subject matter of the present application to provide a new and improved coupling of a replaceable cutting insert in an insert holder.

It is a yet further object of the subject matter of the present application to provide a coupling where the force applied to the peripheral wall abutment surfaces of the insert pocket is in the proximity of the pocket base surface.

SUMMARY OF THE INVENTION

In accordance with a first aspect of the subject matter of the present application there is provided a replaceable cutting insert having an insert longitudinal axis defining opposite forward and rear directions and further having an insert axial plane containing the insert longitudinal axis, the cutting insert comprising:

opposing insert inner and outer side surfaces and an insert peripheral surface extending therebetween, the insert peripheral surface comprising opposing insert front and rear end surfaces and opposing insert upper and lower surfaces connecting the insert front and rear end surfaces;

a cutting portion comprising a primary cutting edge formed at the intersection of the insert front end surface and the insert upper surface; and a mounting portion, connected to the cutting portion, and comprising:

two spaced apart peripheral abutment ridges, distal the insert outer side surface, and extending along the insert rear end surface and the insert lower surface, respectively, and converging towards each other at an acute insert wedge angle in a rearward direction of the cutting insert, away from the primary cutting edge.

In accordance with a second aspect of the subject matter of the present application there is further provided a cutting tool comprising, in combination:

an insert holder, having a holder longitudinal axis; and a cutting insert, of the sort described above, removably attached to the insert holder by a fastening member.

It is understood that the above-said is a summary, and that features described hereinafter may be applicable in any combination to the subject matter of the present application, for example, any of the following features may be applicable to the cutting insert or the cutting tool.

Each peripheral abutment ridge can be located closer to the insert inner side surface than to the insert outer side surface.

The insert axial plane passes between the insert inner and outer side surfaces and also passes through the primary cutting edge. Each peripheral abutment ridge can lie in a ridge plane which is parallel to the insert axial plane, and spaced apart therefrom by a constant ridge distance.

In a cross-section taken in a plane perpendicular to, and through, a longitudinal extension of each peripheral abutment ridge, an imaginary tangent line tangent to the peripheral abutment ridge can form an acute internal ridge angle with the insert inner side surface.

The imaginary tangent line may not intersect any other point on the insert peripheral surface.

Each peripheral abutment ridge can be concavely curved in a direction from the insert inner side surface to the insert outer side surface.

Each peripheral abutment ridge can be defined by an imaginary cylinder having a ridge radius. The ridge radius can be in the range $0.25 \text{ mm} \leq R \leq 0.75 \text{ mm}$.

The ridge radius can be equal to 0.5 mm.

Each peripheral abutment ridge can be spaced apart from the insert outer side surface by an outer clearance surface. The outer clearance surface can be planar and slope outwardly in a direction from the insert outer side surface towards the insert inner side surface.

The outer clearance surface can form an acute internal outer clearance angle with the insert inner side surface.

The outer clearance angle can be in the range $60° \leq \beta \leq 65°$.

Each peripheral abutment ridge can be spaced apart from the insert inner side surface by an inner clearance surface. The inner clearance surface can be planar.

The inner clearance surface can be perpendicular to the insert inner side surface.

The inner clearance surface has an inner clearance surface width. The inner clearance surface width can be in the range $0.5 \text{ mm} \leq W \leq 0.9 \text{ mm}$.

Each peripheral abutment ridge can extend to the insert inner side surface.

The cutting insert can be non-indexable.

The insert inner side surface can comprise an inner side transverse surface extending between the insert upper and lower surfaces mid-way along the insert longitudinal axis, and oriented transversely thereto, the inner side transverse surface delimiting the cutting portion and the mounting portion.

The mounting portion can comprise an insert through bore passing through the insert inner and outer side surfaces along a through bore axis.

In a top view of the cutting insert:
the mounting portion has mounting portion width measured in the direction perpendicular to insert axial plane. The cutting portion has a cutting portion width measured in the direction perpendicular to the insert axial plane. The cutting portion width can be less than the mounting portion width.

In a top view of the cutting insert:
the mounting portion has a mounting portion length measured along the insert longitudinal axis. The cutting portion has a cutting portion length measured along the insert longitudinal axis. The cutting portion length can be greater than the mounting portion length.

The insert inner side surface at the mounting portion can comprise three spaced apart insert projections protruding therefrom, each insert projection can comprise an inner side abutment surface, the inner side abutment surfaces can be co-planar with each other.

The insert inner and outer side surfaces at the cutting portion can be curved in a front view of the cutting insert.

A forward portion of the insert upper surface can slope towards the insert longitudinal axis in the forward direction. The primary cutting edge can be located in a midway portion of the cutting insert, in a height direction of the cutting portion.

The mounting portion can be devoid of any abutment surfaces on the insert front end surface and the insert upper surface.

The cutting insert can comprise a mounting portion peripheral ridge that is distal the insert outer side surface and extends continuously in a peripheral direction along the entirety of the insert peripheral surface of the cutting insert at the mounting portion. The two peripheral abutment ridges can be formed on the mounting portion peripheral ridge.

The insert inner side surface at the mounting portion can comprise three spaced apart insert projections protruding therefrom, each insert projection comprising an inner side abutment surface. The two peripheral abutment ridges can comprise a lower peripheral abutment ridge located on the insert lower surface and a rear peripheral abutment ridge located on the insert rear end surface. The insert holder can comprise:
a holder forward end surface and a holder peripheral surface forming a circumferential boundary thereof; and
an insert pocket recessed in the holder peripheral surface and comprising:
a pocket opening that opens out to the holder forward end surface; and
a pocket base surface and a pocket peripheral wall surface oriented substantially perpendicularly to the pocket base surface, the pocket base surface comprising a pocket side abutment surface, and the pocket peripheral wall surface comprising pocket rear and lower abutment surfaces that slope outwardly in a direction from the holder peripheral surface towards the pocket base surface and converge towards each other at an acute pocket wedge angle in a direction away from the pocket opening;
wherein in an assembled position of the cutting tool:
the pocket lower abutment surface can abut the lower peripheral abutment ridge, the pocket rear abutment surface can abut the rear peripheral abutment ridge and the pocket side abutment surface can abut the insert inner side surface.

The pocket lower abutment surface and the pocket rear abutment surface can be closer to the pocket base surface that to the holder peripheral surface.

The mounting portion can comprise an insert through bore passing through the insert inner and outer side surfaces along a through bore axis. The pocket base surface can comprise a threaded pocket bore. The fastening member can be a retaining screw that is located in the insert through bore and threadingly engaged with the threaded pocket bore.

The insert upper surface can be spaced apart from the pocket peripheral wall surface.

The insert wedge angle can be greater than the acute pocket wedge angle.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
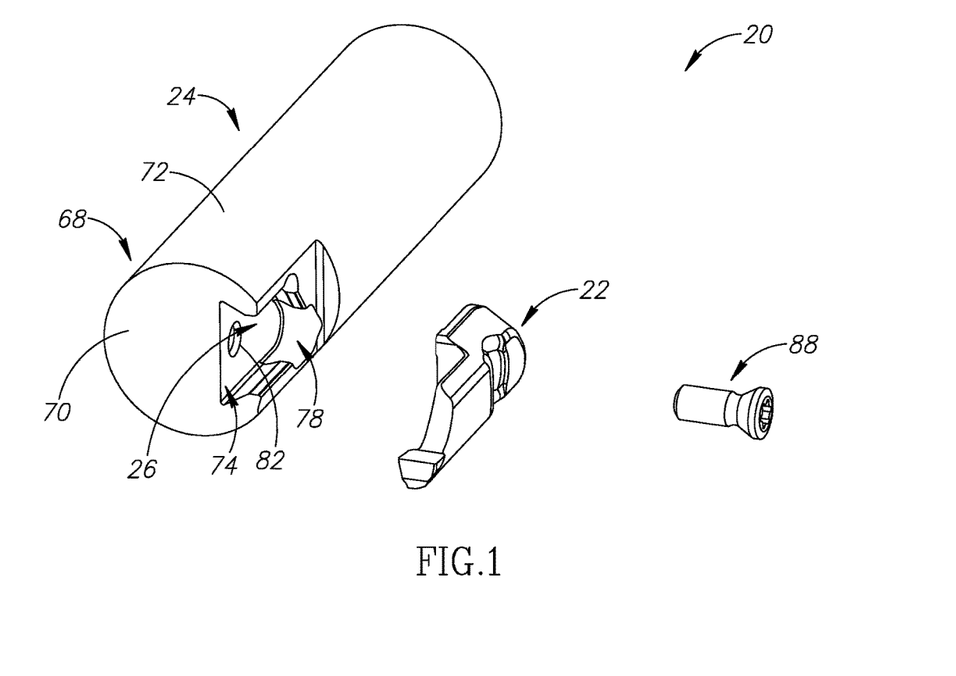
FIG. 1 is a perspective exploded view of a cutting tool showing a cutting insert and an insert pocket of an insert holder.

Attention is first drawn to FIG. 1 showing a cutting tool 20, of the type used for grooving, more precisely face grooving, in accordance with an embodiment of the subject matter of the present application. The cutting tool 20 has a replaceable cutting insert 22 and an insert holder 24. The cutting tool 20 is adjustable between an assembled position and an unassembled position. In the assembled position of the cutting tool 20, the cutting insert 22 is removably retained in an insert pocket 26 of the insert holder 24.

The insert holder 24 may be made of a first hard material and the cutting insert 22 of a second hard material that is harder than the first hard material. For example, the insert holder 24 may be made of steel and the cutting insert 22 may be made of cemented carbide.

Figure 2:
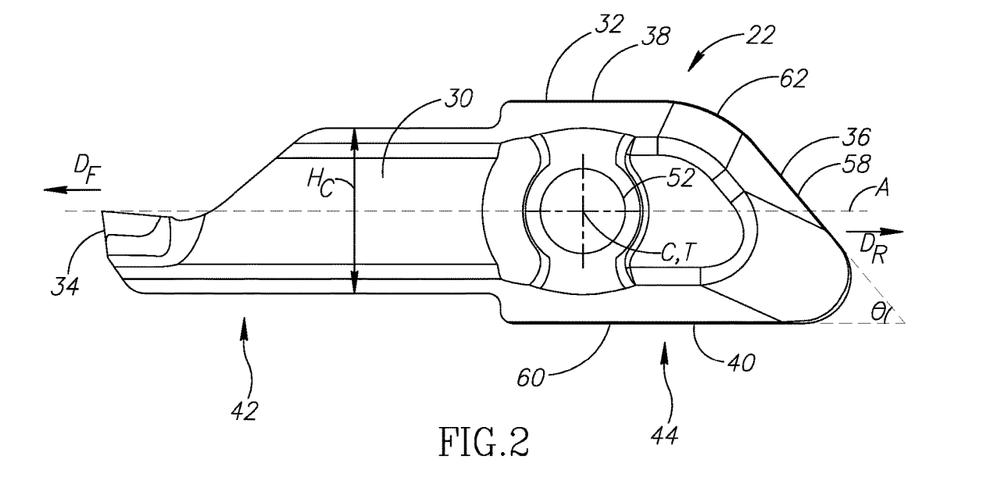
FIG. 2 is an outer side view of the cutting insert shown in FIG. 1.
Figure 3:
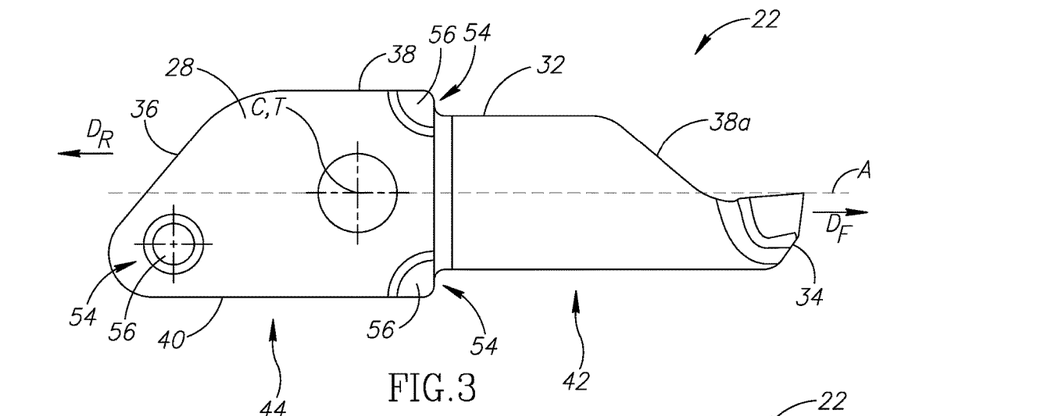
FIG. 3 is an inner side view of the cutting insert shown in FIG. 2.

Making reference to FIGS. 2 to 6, a first aspect of the subject matter of the present application relates to the cutting insert 22. The cutting insert 22 has an insert longitudinal axis A that defines opposite forward and rearward directions $D_F$, $D_R$. The cutting insert 22 includes opposing insert inner and outer side surface 28, 30 and an insert peripheral surface 32 that extends therebetween. The insert peripheral surface 32 includes opposing insert front and rear end surfaces 34, 36 that connect opposing insert upper and lower surfaces 38, 40. The insert rear end surface 36 is adjacent the insert lower surface 40. The insert longitudinal axis A intersects the insert rear end surface 36 and passes between the insert upper and lower surfaces 38, 40. Generally speaking, the insert longitudinal axis A can also intersect the insert front end surface 34. It is noted however that, as is known in the field of face grooving, a forward portion 38a of the insert upper surface 38 can slope towards the insert longitudinal axis A in the forward direction $D_F$ (as seen in FIG. 2). In such a configuration, the insert longitudinal axis A can intersect the insert upper surface 38 as opposed to the insert front end surface 34. The cutting insert 22 has an insert central axis C. The insert peripheral surface 32 extends circumferentially about, and faces away from, the insert central axis C. The insert central axis C can intersect the insert longitudinal axis A and can be perpendicular thereto. The cutting insert 22 has an insert axial plane P that contains the insert longitudinal axis A and passes between the insert inner and outer side surface 28, 30. The insert axial plane P also passes through the primary cutting edge 48. The insert axial plane P can be perpendicular to the insert central axis C.

The cutting insert 22 includes a cutting portion 42 and a mounting portion 44, connected to the cutting portion 42. The cutting insert 22 may be non-indexable, that is single-ended, with exactly one cutting portion 42 located at a forward end of the cutting insert 22 and the mounting portion 44 located at a rear end of the cutting insert 22.

Figure 4:
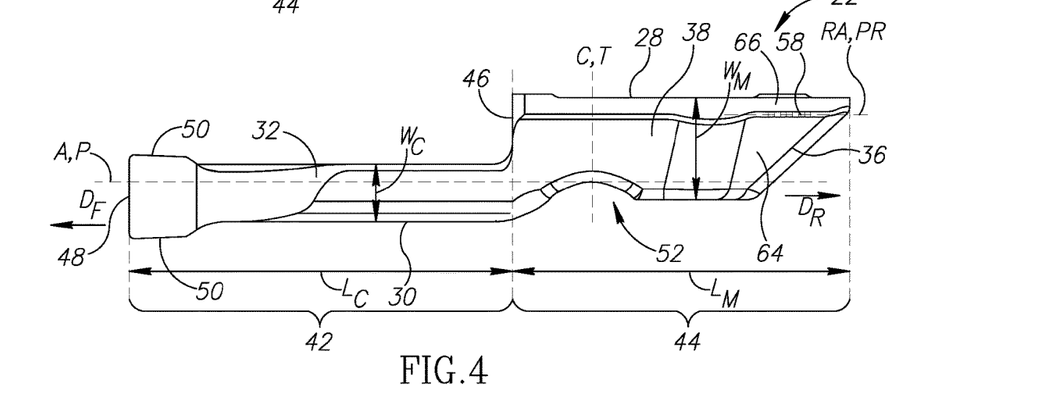
FIG. 4 is a top view of the cutting insert shown in FIG. 2.
Figure 5:
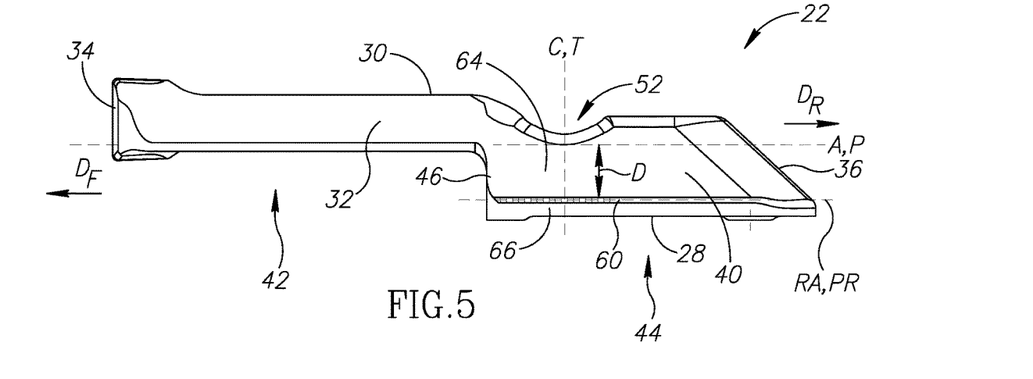
FIG. 5 is a bottom view of the cutting insert shown in FIG. 2.

Referring in particular to FIGS. 4 and 5, in accordance with some embodiments of the subject matter of the present application, the insert inner side surface 28 can include an inner side transverse surface 46 that can extend between the insert upper and lower surfaces 38, 40 and be located mid-way along the insert longitudinal axis A. The inner side transverse surface 46 can be oriented transversely, preferably perpendicular, to the insert longitudinal axis A. The inner side transverse surface 46 can delimit the cutting portion 42 and the mounting portion 44. In a top view of the cutting insert 22 (i.e. FIG. 4), the mounting portion 44 has mounting portion width $W_M$ measured in the direction perpendicular to insert axial plane P between the insert inner and outer side surfaces 28, 30. The cutting portion 42 has a cutting portion width $W_C$ also measured in the direction perpendicular to the insert axial plane P between the insert inner and outer side surfaces 28, 30. The cutting portion width $W_C$ can be less than the mounting portion width $W_M$. Also, in a top view of the cutting insert 22 the mounting portion 44 has a mounting portion length $L_M$ measured along the insert longitudinal axis A Likewise, the cutting portion 42 has a cutting portion length $L_C$ measured along the insert longitudinal axis A. The cutting portion length $L_C$ can be greater than the mounting portion length $L_M$. The cutting portion 42 has a cutting portion height $H_C$ measured in the direction perpendicular to the insert longitudinal axis A in a view along the insert central axis C.

Referring now to FIG. 4, the cutting portion 42 includes a primary cutting edge 48, for grooving/parting metal cutting operations, formed at the intersection of the insert front end surface 34 and the insert upper surface 38. In accordance with some embodiments of the subject matter of the present application, the cutting portion 42 can also include two secondary cutting edges 50, for groove-turning metal cutting operations, formed at the intersection of the insert upper surface 38 and the insert inner and outer side surfaces 28, 30 respectively and extending from either side of the primary cutting edge 48.

Figure 6:
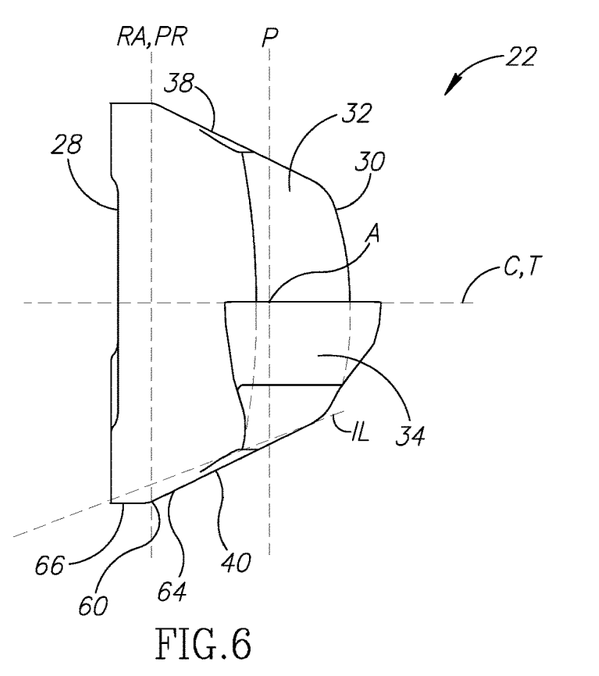
FIG. 6 is a front view of the cutting insert shown in FIG. 2.

Making reference to FIG. 6, in accordance with some embodiments of the subject matter of the present application, the insert inner and outer side surfaces 28, 30 at the cutting portion 42 can be curved in a front view of the cutting insert 22 to allow for face grooving of a radiused groove. Beneficially, as mentioned earlier, a forward portion 38a of the insert upper surface 38 can slope towards the insert longitudinal axis A in the forward direction $D_F$ so that the primary cutting edge 48 is located in a midway portion of the cutting insert 22, in the height direction of the cutting portion 42.

In accordance with some embodiments of the subject matter of the present application, the mounting portion 44 can include an insert through bore 52 that passes through the insert inner and outer side surfaces 28, 30 along a through bore axis T. The through bore axis T can be aligned with the insert central axis C. Thus, the insert axial plane P can be perpendicular to the through bore axis T and as seen in FIGS. 4 and 5, the cutting insert lacks mirror symmetry about the insert axial plane P and also about any plane parallel thereto. As seen best in FIGS. 4 and 5, the insert inner side surface 28 at the mounting portion 44 can be planar. Making reference to FIG. 3, the insert inner side surface 28 at the mounting portion 44 can include three spaced apart insert projections 54 protruding therefrom. The insert projections 54 can be angularly spaced around the insert through bore 52. Each insert projection 54 can include an inner side abutment surface 56, designed to abut a respective abutment surface in the insert pocket 26. The inner side abutment surfaces 56 can be co-planar with each other.

The mounting portion 44 includes two spaced apart peripheral abutment ridges, a rear peripheral abutment ridge 58 located on the insert rear end surface 36 and a lower peripheral abutment ridge 60 located on the insert lower surface 40. The two peripheral abutment ridges 58, 60 are configured to abut respective abutment surfaces in the insert pocket 26. Each peripheral abutment ridge 58, 60 is distal the insert outer side surface 30. The two peripheral abutment ridges 58, 60 converge towards each other at an acute insert wedge angle θ in a rearward direction $D_R$ of the cutting insert 22, away from the primary cutting edge 48. In accordance with some embodiments of the subject matter of the present application, the wedge angle θ can be in the range 45°≤θ≤55°. Preferably, the wedge angle θ can have a value of 50°. The mounting portion 44 can be devoid of any abutment surfaces on the insert front end surface 34 and the insert upper surface 38. In a cross-section of the insert taken in plane perpendicular to the insert longitudinal axis A and passing through a peripheral abutment ridge 58, 60, each such peripheral abutment ridge 58, 60 protrudes outwardly with respect to an imaginary line IL drawn between the intersections of the insert peripheral surface 32 and insert inner and outer side surface 28, 30 respectively.

In this non-limiting example shown in the drawings (FIG. 2, for example), the cutting insert 22 can include a mounting portion peripheral ridge 62 that extends continuously in a peripheral direction along the entirety of the insert peripheral surface 32 of the cutting insert 22 at the mounting portion 44. The two peripheral abutment ridges 58, 60 can be formed on the mounting portion peripheral ridge 62, and spaced apart from one another along the mounting portion peripheral ridge 62. Alternatively, the cutting insert 22 can include a plurality of spaced apart mounting portion peripheral ridges 62 that extend along portions of the insert peripheral surface 32 of the cutting insert 22 at the mounting portion 44. In such a configuration, the two peripheral abutment ridges 58, 60 can be formed on different mounting portion peripheral ridges 62 (not shown).

It should be noted that use of the term "peripheral direction" throughout the description and claims refers to direction about the insert central axis C, as seen in FIG. 2.

In accordance with some embodiments of the subject matter of the present application, each peripheral abutment ridge 58, 60 can be located closer to the insert inner side surface 28 than to the insert outer side surface 30. Each peripheral abutment ridge 58, 60 can extends along a respective ridge axis RA. Each peripheral abutment ridge 58, 60 can be located in a common ridge plane $P_R$ which is parallel to the insert axial plane P and spaced apart from the insert axial plane P by a constant ridge distance D. Thus, each ridge axis RA can be parallel to the insert inner side surface 28.

As seen in FIG. 6, in accordance with some embodiments of the subject matter of the present application, each peripheral abutment ridge 58, 60 can be spaced apart from the insert outer side surface 30 by an outer clearance surface 64. The outer clearance surface 64 can be planar. The outer clearance surface 64 can slope outwardly, that is away from the insert central axis C, in a direction from the insert outer side surface 30 towards the insert inner side surface 28. That is to say, referring now to FIG. 9, the outer clearance surface 64 can form an acute internal outer clearance angle β with the insert inner side surface 28. The outer clearance angle β can be in the range 60°≤β≤65°. It is noted that FIGS. 9-10 relate to a cross-section taken through either the rear peripheral abutment ridge 58 or the lower peripheral abutment ridge 60.

Figure 10:
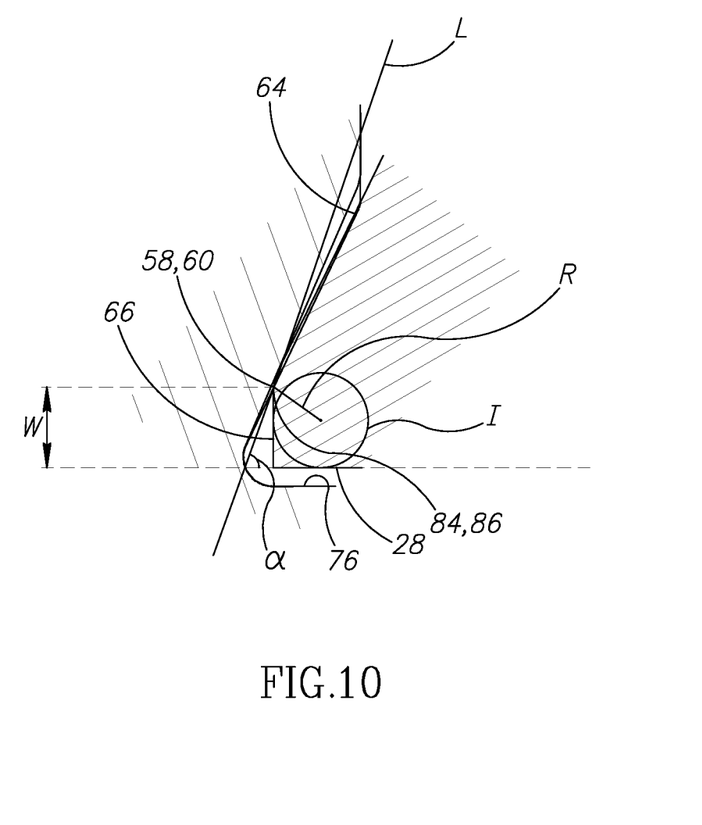
FIG. 10 is a detail of FIG. 9.

In accordance with some other embodiments of the subject matter of the present application, each peripheral abutment ridge 58, 60 can be spaced apart from the insert inner side surface 28 by an inner clearance surface 66. In such a configuration, each peripheral abutment ridge 58, 60 is formed at the intersection of the outer clearance surface 64 and the inner clearance surface 66. The inner clearance surface 66 can be planar and can be perpendicular to the insert inner side surface 28. Referring to FIG. 10, the inner clearance surface 66 can have an inner clearance surface width W. The inner clearance surface width W can be in the range 0.5 mm≤W≤0.9 mm.

Figure 9:
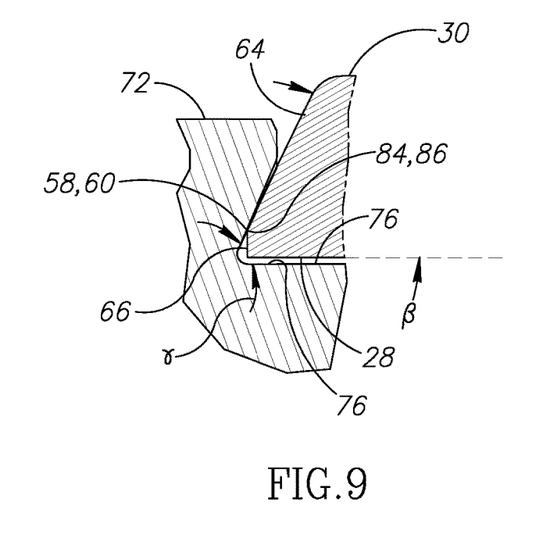
FIG. 9 is a portion of cross section view taken along lines IX-IX shown in FIG. 8.

In accordance with some embodiments of the subject matter of the present application, in a cross-section taken in a plane perpendicular to, and through, a longitudinal extension of each peripheral abutment ridge 58, 60 (i.e. FIGS. 9 and 10), an imaginary tangent line L tangent to the peripheral abutment ridge 58, 60 can form an acute internal ridge angle α with the insert inner side surface 28. The imaginary tangent line L may not intersect any other point on the insert peripheral surface 32. As seen in FIG. 9, each peripheral abutment ridge 58, 60 can be concavely curved in a direction from the insert inner side surface 28 to the insert outer side surface 30. Thus, the insert peripheral surface 32 nears the insert central axis C as it extends from the insert inner side surface 28 towards the insert outer side surface 30.

Each peripheral abutment ridge 58, 60 can be defined by an imaginary cylinder having a ridge radius R. The ridge radius R can be in the range 0.25 mm≤R≤0.75 mm. Preferably, the ridge radius R can be equal to 0.5 mm. The imaginary cylinder of the lower peripheral abutment ridge 60 has an axis that can be co-directional with the insert longitudinal axis A.

Figure 7:
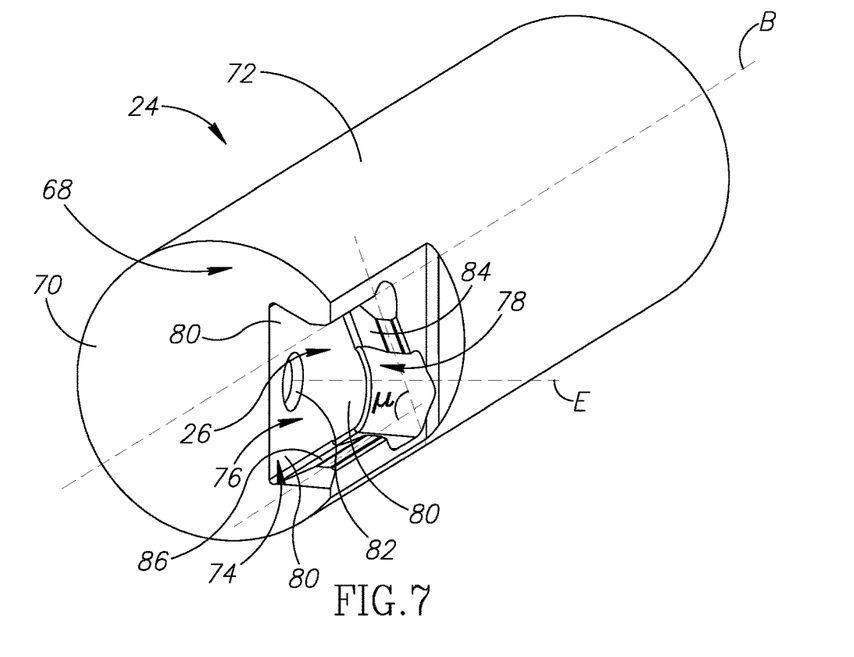
FIG. 7 is a perspective view of the insert pocket shown in FIG. 1.

A second aspect of the subject matter of the present application relates to the cutting tool 20 including the cutting insert 22, as described hereinabove, and the insert holder 24. Reference is now made to FIG. 7, showing the insert holder 24, having a holder longitudinal axis B. The holder longitudinal axis B can extend in the same direction as the insert longitudinal axis A. The insert holder 24 has a holder forward end 68. The insert holder 24 includes a holder forward end surface 70, formed at the holder forward end 68, and a holder peripheral surface 72, where the holder peripheral surface 72 forms a circumferential boundary of the holder forward end surface 70.

In this non-limiting example shown in the drawings, the holder peripheral surface 72 can be cylindrical, in which case there is only one continuous surface the holder peripheral surface 72. However, it will be understood that the holder peripheral surface 72 can include a plurality, for example four, holder peripheral sub-surfaces.

The insert pocket 26 is recessed in the holder peripheral surface 72 and includes a pocket opening 74 that opens out to the holder forward end surface 70. The purpose of the insert pocket 26 is to accommodate the cutting insert 22 when removably attached to the insert holder 24. The insert pocket 26 includes a pocket base surface 76 and a pocket peripheral wall surface 78 oriented substantially perpendicularly thereto. The pocket base surface 76 includes a pocket side abutment surface 80, for abutting respective surfaces on the cutting insert 22. The insert pocket 26 has a pocket central axis E where the pocket peripheral wall surface 78 extends circumferentially about, and faces towards, the pocket central axis E. The pocket central axis E can be perpendicular to the pocket base surface 76. In accordance with some embodiments of the subject matter of the present application, the pocket side abutment surface 80 can be planar. The pocket base surface 76 can include a threaded pocket bore 82. The threaded pocket bore 82 is designed for providing a means to removably attach the cutting insert 22 to the insert holder 24.

The pocket peripheral wall surface 78 includes pocket rear and lower abutment surfaces 84, 86, for abutting respective surfaces on the cutting insert 22. The pocket rear and lower abutment surfaces 84, 86 slope outwardly, that is away from the pocket central axis E, in a direction from the holder peripheral surface 72 towards the pocket base surface 76. That is to say, referring now to FIG. 9, the pocket rear and lower abutment surfaces 84, 86 can form an acute external pocket side angle γ with the pocket base surface 76. The pocket side angle γ can be greater than the internal outer clearance angle β. The pocket rear and lower abutment surfaces 84, 86 converge towards each other at an acute pocket wedge angle μ in a direction away from the pocket opening 74. In accordance with some embodiments of the subject matter of the present application, the pocket rear and lower abutment surfaces 84, 86 can be planar. The pocket lower abutment surface 86 and the pocket rear abutment surface 84 can be closer to the pocket base surface 76 that to the holder peripheral surface 72. The insert wedge angle θ can be greater than the acute pocket wedge angle μ.

The cutting insert 22 is removably attached to the insert holder 24 by a fastening member 88. In accordance with some embodiments of the subject matter of the present application the fastening member 88 can be a retaining screw, that is located in the insert through bore 52 and threadingly engaged with the threaded pocket bore 82. The insert through bore 52 and the threaded pocket bore 82 may be eccentric with respect to each other, such that a component of the clamping force can be directed rearwardly and downwardly.

Figure 8:
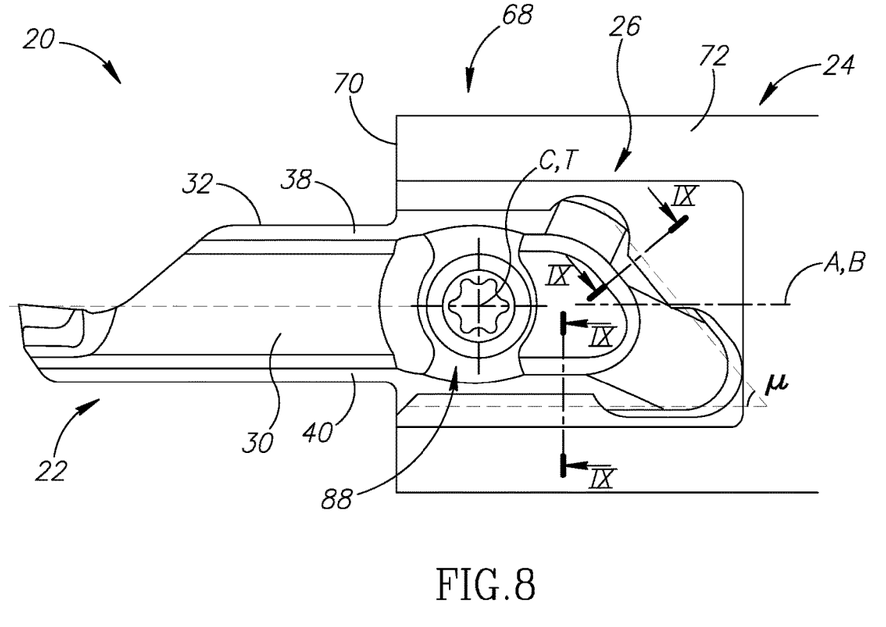
FIG. 8 is a side view of the insert pocket shown in FIG. 1 with the cutting insert releasably retained therein.

In the assembled position of cutting tool 20, the pocket rear abutment surface 84 abuts the rear peripheral abutment ridge 58, the pocket lower abutment surface 86 abuts the lower peripheral abutment ridge 60, and the pocket side abutment surface 80 abuts the insert inner side surface 28. More precisely, pocket side abutment surface 80 abuts the three inner side abutment surfaces 56. In accordance with some embodiments of the subject matter of the present application, the insert upper surface 38 can be spaced apart from the pocket peripheral wall surface 78. The holder forward end surface 70 can be aligned with the inner side transverse surface 46.

It is noted that the peripheral contact between the cutting insert 22 and the insert holder 24 is not planar to planar. Rather, the peripheral contact on the cutting insert 22 is formed on the rear and lower peripheral abutment ridges 58, 60 where the outer and inner clearance surfaces 64, 66 do not contact any part of the pocket peripheral wall surface 78. Thus, the peripheral abutment region on the cutting insert 22 is essentially a line or strip that contacts the pocket side abutment surface 80 on the insert pocket 26. Advantageously, by virtue of the abutment ridges 58, 60, the peripheral contact can be located at an exact pre-determined position.

It is further noted that the peripheral contact on the insert pocket 26 is formed on pocket rear and lower abutment surfaces 84, 86 which are spaced apart from the holder peripheral surface 72. Therefore, the forces applied by the cutting insert 22 are at inner portions of holder peripheral surface 78 as opposed to outer portions of the holder peripheral surface 78. Said inner portions are more rigid and robust than said outer portions, and thus a stronger coupling between the cutting insert 22 and the insert holder 24 is achieved.

By virtue of the foregoing coupling between the cutting insert 22 and insert holder 24, the maximum depth of cut defined by the cutting portion length $L_C$ can be increased without the risk of increased vibration of the cutting portion 42 which may lead to a surface finish of the workpiece of reduced quality. For example, the cutting portion length $L_C$ can be 15 mm or greater. This is particularly important in face grooving annular grooves of small diameter (for example with an external diameter in the region of 10 mm), since the cutting portion height $H_C$ is limited in face grooving.

Although the subject matter of the present application has been described to a certain degree of particularity, it should be understood that various alterations and modifications could be made without departing from the spirit or scope of the invention as hereinafter claimed.

What is claimed is:

1. A non-indexable, replaceable cutting insert (22) having an insert longitudinal axis (A) defining opposite forward and rear directions (DF, DR) and further having an insert axial plane (P) containing the insert longitudinal axis (A), the cutting insert (22) comprising:
    opposing insert inner and outer side surfaces (28, 30) and an insert peripheral surface (32) extending therebetween, the insert peripheral surface (32) comprising opposing insert front and rear end surfaces (34, 36) and opposing insert upper and lower surfaces (38, 40) connecting the insert front and rear end surfaces (34, 36);
    a cutting portion (42) comprising a primary cutting edge (48) formed at the intersection of the insert front end surface (34) and the insert upper surface (38); and
    a mounting portion (44), connected to the cutting portion (42), and comprising:
        an insert through bore (52) passing through the insert inner and outer side surfaces (28, 30) along a through bore axis (T); and
        two spaced apart peripheral abutment ridges (58, 60), located on the insert rear end surface (36) and the insert lower surface (40), respectively, and converging towards each other at an acute insert wedge angle (θ) in a rearward direction (DR) of the cutting insert (22), away from the primary cutting edge (48) wherein:
    each peripheral abutment ridge (58, 60) is spaced apart from both the inner and outer side surfaces (28, 30) by respective inner and outer clearance surfaces (66, 64); and
    the cutting insert is non-indexable.

2. The cutting insert (22) according to claim 1, wherein each peripheral abutment ridge (58, 60) is located closer to the insert inner side surface (28) than to the insert outer side surface (30).

3. The cutting insert (22) according to claim 1, wherein:
    the insert axial plane (P) is perpendicular to the through bore axis (T), passes in-between the insert inner and outer side surfaces (28, 30) and also passes through the primary cutting edge (48); and
    each peripheral abutment ridge (58, 60) lies in a ridge plane (PR) which is parallel to the insert axial plane (P), and spaced apart therefrom by a constant ridge distance (D).

4. The cutting insert (22) according to claim 1, wherein in a cross-section taken in a plane perpendicular to, and through, a longitudinal extension of each peripheral abutment ridge (58, 60), an imaginary tangent line (L) tangent to the peripheral abutment ridge (58, 60) forms an acute internal ridge angle (α) with the insert inner side surface (28).

5. The cutting insert (22) according to claim 4, wherein the imaginary tangent line (L) does not intersect any other point on the insert peripheral surface (32).

6. The cutting insert (22) according to claim 1, wherein each peripheral abutment ridge (58, 60) is concavely curved in a direction from the insert inner side surface (28) to the insert outer side surface (30).

7. The cutting insert (22) according to claim 6, wherein:
    each peripheral abutment ridge (58, 60) is defined by an imaginary cylinder having a ridge radius (R); and
    the ridge radius (R) is in the range 0.25 mm≤R≤0.75 mm.

8. The cutting insert (22) according to claim 7, wherein the ridge radius (R) is equal to 0.5 mm.

9. The cutting insert (22) according to claim 1, wherein:
    the insert has a central axis (C) which intersects the longitudinal axis (A) and is perpendicular to both the longitudinal axis (A) and the insert axial plane (P); and the outer clearance surface (64) is planar and slopes away from the central axis (C), in a direction from the insert outer side surface (30) towards the insert inner side surface (28).

10. The cutting insert (22) according to claim 9, wherein the outer clearance surface (64) forms an acute internal outer clearance angle (β) with the insert inner side surface (28).

11. The cutting insert (22) according to claim 9, wherein the outer clearance angle (β) is in the range 60°≤β≤65°.

12. The cutting insert (22) according to claim 1, wherein: the inner clearance surface (66) is planar.

13. The cutting insert (22) according to claim 12, wherein the inner clearance surface (66) is perpendicular to the insert inner side surface (28).

14. The cutting insert (22) according to claim 12, wherein:
the inner clearance surface (66) has an inner clearance surface width (W); and
the inner clearance surface width (W) is in the range 0.5 mm≤W≤0.9 mm.

15. The cutting insert (22) according to claim 1, wherein each peripheral abutment ridge (58, 60) extends to the insert inner side surface (28).

16. The cutting insert (22) according to claim 1, wherein the cutting insert (22) is non-indexable.

17. The cutting insert (22) according to claim 1, wherein:
the insert inner side surface (28) comprises an inner side transverse surface (46) extending between the insert upper and lower surfaces (38, 40) mid-way along the insert longitudinal axis (A), and oriented transversely to the insert longitudinal axis (A), the inner side transverse surface (46) delimiting the cutting portion (42) and the mounting portion (44).

18. The cutting insert (22) according to claim 1, wherein in a top view of the cutting insert (22):
the mounting portion (44) has mounting portion width (WM) measured in the direction perpendicular to the insert axial plane (P);
the cutting portion (42) has a cutting portion width (WC) measured in the direction perpendicular to the insert axial plane (P); and
the cutting portion width (WC) is less than the mounting portion width (WM).

19. The cutting insert (22) according to claim 1, wherein in a top view of the cutting insert (22):
the mounting portion (44) has a mounting portion length (LM) measured in along the insert longitudinal axis (A);
the cutting portion (42) has a cutting portion length (LC) measured along the insert longitudinal axis (A); and
the cutting portion length (LC) is greater than the mounting portion length (LM).

20. A replaceable cutting insert (22) having an insert longitudinal axis (A) defining opposite forward and rear directions ($D_F$, $D_R$) and further having an insert axial plane (P) containing the insert longitudinal axis (A), the cutting insert (22) comprising:
opposing insert inner and outer side surfaces (28, 30) and an insert peripheral surface (32) extending therebetween, the insert peripheral surface (32) comprising opposing insert front and rear end surfaces (34, 36) and opposing insert upper and lower surfaces (38, 40) connecting the insert front and rear end surfaces (34, 36);
a cutting portion (42) comprising a primary cutting edge (48) formed at the intersection of the insert front end surface (34) and the insert upper surface (38); and
a mounting portion (44), connected to the cutting portion (42), and comprising:
two spaced apart peripheral abutment ridges (58, 60), distal the insert outer side surface (30), and extending along the insert rear end surface (36) and the insert lower surface (40), respectively, and converging towards each other at an acute insert wedge angle (θ) in a rearward direction (DR) of the cutting insert (22), away from the primary cutting edge (48); wherein:
the insert inner side surface (28) at the mounting portion (44) comprises three spaced apart insert projections (54) protruding therefrom, each insert projection (54) comprising an inner side abutment surface (56), the inner side abutment surfaces (56) being co-planar with each other.

21. The cutting insert (22) according to claim 1, wherein the insert inner and outer side surfaces (28, 30) at the cutting portion (42) are curved in a front view of the cutting insert (22).

22. The cutting insert (22) according to claim 1, wherein:
a forward portion (38a) of the insert upper surface (38) slopes towards the insert longitudinal axis (A) in the forward direction (DF); and
the primary cutting edge (48) is located in a midway portion of the cutting insert (22), in a height direction (HC) of the cutting portion (42).

23. The cutting insert (22) according to claim 1, wherein the insert front end surface (34) and the insert upper surface (38) are devoid of any abutment surfaces.

24. The cutting insert (22) according to claim 1, wherein:
the cutting insert (22) comprises a mounting portion peripheral ridge (62) that is distal the insert outer side surface (30) and extends continuously in a peripheral direction along the entirety of the insert peripheral surface (32) of the cutting insert (22) at the mounting portion (44); and
the two peripheral abutment ridges (58, 60) are formed on the mounting portion peripheral ridge (62).

25. A cutting tool (20) comprising, in combination:
an insert holder (24), having a holder longitudinal axis (B); and
a cutting insert (22), in accordance with claim 1, removably attached to the insert holder (24) by a fastening member (88).

26. A cutting tool (20) comprising, in combination:
an insert holder (24), having a holder longitudinal axis (B); and
a replaceable cutting insert (22), removably attached to the insert holder (24) by a fastening member (88), wherein the cutting insert comprises:
an insert longitudinal axis (A) defining opposite forward and rear directions ($D_F$, $D_R$) and further having an insert axial plane (P) containing the insert longitudinal axis (A);
opposing insert inner and outer side surfaces (28, 30) and an insert peripheral surface (32) extending therebetween, the insert peripheral surface (32) comprising opposing insert front and rear end surfaces (34, 36) and opposing insert upper and lower surfaces (38, 40) connecting the insert front and rear end surfaces (34, 36);
a cutting portion (42) comprising a primary cutting edge (48) formed at the intersection of the insert front end surface (34) and the insert upper surface (38);
a mounting portion (44), connected to the cutting portion (42), and comprising:

two spaced apart peripheral abutment ridges (58, 60), distal the insert outer side surface (30), and extending along the insert rear end surface (36) and the insert lower surface (40), respectively, and converging towards each other at an acute insert wedge angle ($\theta$) in a rearward direction (DR) of the cutting insert (22), away from the primary cutting edge (48);

the insert inner side surface (28) at the mounting portion (44) comprising three spaced apart insert projections (54) protruding therefrom, each insert projection (54) comprising an inner side abutment surface (56); and the two peripheral abutment ridges (58, 60) comprising a rear peripheral abutment ridge (58) located on the insert rear end surface (36) and a lower peripheral abutment ridge (60) located on the insert lower surface (40);

wherein the insert holder (24) comprises:

a holder forward end surface (70) and a holder peripheral surface (72) forming a circumferential boundary thereof; and an insert pocket (26) recessed in the holder peripheral surface (72) and comprising:

a pocket opening (74) that opens out to the holder forward end surface (70); and a pocket base surface (76) and a pocket peripheral wall surface (78) oriented substantially perpendicularly to the pocket base surface (76), the pocket base surface (76) comprising a pocket side abutment surface (80), and the pocket peripheral wall surface (78) comprising pocket rear and lower abutment surfaces (84, 86) that slope outwardly in a direction from the holder peripheral surface (72) towards the pocket base surface (86) and converge towards each other at an acute pocket wedge angle ($\mu$) in a direction away from the pocket opening (74);

wherein in an assembled position of the cutting tool (20):

the pocket lower abutment surface (86) abuts the lower peripheral abutment ridge (60), the pocket rear abutment surface (84) abuts the rear peripheral abutment ridge (58) and the pocket side abutment surface (80) abuts the insert inner side surface (28).

27. The cutting tool (20) according to claim 26, wherein: the pocket lower abutment surface (86) and the pocket rear abutment surface (84) are closer to the pocket base surface (76) that to the holder peripheral surface (72).

28. The cutting tool (20) according to claim 26, wherein: the mounting portion (44) comprises an insert through bore (52) passing through the insert inner and outer side surfaces (28, 30) along a through bore axis (T);

the pocket base surface (76) comprises a threaded pocket bore (82); and the fastening member (88) is a retaining screw that is located in the insert through bore (52) and threadingly engaged with the threaded pocket bore (82).

29. The cutting tool (20) according to claim 26, wherein the insert upper surface (38) is spaced apart from the pocket peripheral wall surface (78).

30. The cutting tool (20) according to claim 26, wherein the insert wedge angle ($\theta$) is greater than the acute pocket wedge angle ($\mu$).

31. The cutting insert (22) according to claim 1, wherein: the insert axial plane (P) is perpendicular to the through bore axis (T), passes in-between the insert inner and outer side surfaces (28, 30) and also passes through the primary cutting edge (48); and the insert lacks mirror symmetry about the insert axial plane (P) and also about any plane parallel thereto.

32. The cutting insert (22) according to claim 1, wherein: the insert has a central axis (C) which intersects the longitudinal axis (A) and is perpendicular to both the longitudinal axis (A) and the insert axial plane (P); and in a cross-section of the insert taken perpendicular to the longitudinal axis (A) and passing through one of the peripheral abutment ridges (58, 60), each such peripheral abutment ridge (58, 60) protrudes outwardly with respect to an imaginary line (IL) drawn between intersections of the insert peripheral surface (32) and insert inner and outer side surface (28, 30) respectively.

33. The cutting insert (22) according to claim 1, wherein: the insert axial plane (P) is perpendicular to the through bore axis (T), passes in-between the insert inner and outer side surfaces (28, 30) and also passes through the primary cutting edge (48); and each peripheral abutment ridge (58, 60) is spaced apart from the insert axial plane (P).

34. The cutting insert (22) according to claim 1, wherein: the insert rear end surface (36) has only a single abutment ridge (58); and the insert lower surface (40) has only a single abutment ridge (60).

\* \* \* \* \*